United States Patent [19]

Beller et al.

[11] Patent Number: 6,067,150
[45] Date of Patent: May 23, 2000

[54] REMOTE MEASUREMENT OF WAVELENGTH DEPENDENT INFORMATION ABOUT OPTICAL COMPONENTS

[75] Inventors: Josef Beller, Hildrizhausen; Peter Thoma, Rottenberg, both of Germany

[73] Assignee: Hewlett-Packard Company, Palo Alto, Calif.

[21] Appl. No.: 09/212,028

[22] Filed: Dec. 15, 1998

[30] Foreign Application Priority Data

Feb. 14, 1998 [EP] European Pat. Off. .............. 98102584

[51] Int. Cl.[7] .................................................. G01N 21/00
[52] U.S. Cl. .......................................... 356/73.1; 356/349
[58] Field of Search .................................. 356/73.1, 345, 356/349; 359/345; 250/227.16

[56] References Cited

U.S. PATENT DOCUMENTS

| | | |
|---|---|---|
| 5,096,277 | 3/1992 | Kleinerman . |
| 5,130,535 | 7/1992 | Kummer et al. ........................ 356/73.1 |
| 5,179,420 | 1/1993 | So et al. . |
| 5,182,667 | 1/1993 | Shibata et al. . |
| 5,375,011 | 12/1994 | Normandin et al. ..................... 356/349 |

FOREIGN PATENT DOCUMENTS

| | | |
|---|---|---|
| 61013129 | 1/1986 | European Pat. Off. . |
| WO 90/16043 | 6/1990 | WIPO . |

OTHER PUBLICATIONS

European Search Report, EP 90 10 2584, Jul. 15, 1998.

*Primary Examiner*—Frank G. Font
*Assistant Examiner*—Tu T. Nguyen

[57] ABSTRACT

Disclosed is a system for determining wavelength dependent information, preferably event loss, reflectance, center wavelength, cross talk, directivity, and/or isolation, about an optical component in an optical structure. The system includes at least one light emitting source for providing light signals at a plurality of different wavelengths to an optical link which is in an optical connection with the optical component, a measuring unit for measuring a backscattered and/or reflected signal versus time returning from the optical structure, and a processing unit for determining the wavelength dependent information about the optical component by processing the measured signal versus time as measured for a plurality of light signals at different wavelengths. A particularly advantageous application of the invention is to determine the wavelength dependent spatial structure of an optical network. In that case, the wavelength dependent information is associated with spatial information representing spatial properties of the optical component.

10 Claims, 5 Drawing Sheets

REMOTE MEASUREMENT OF WAVELENGTH DEPENDENT INFORMATION ABOUT OPTICAL COMPONENTS

BACKGROUND OF THE INVENTION

The present invention relates to the determination of wavelength dependent information about optical components.

There are two typical measurement setups as known in the art for determining wavelength dependent information about—or wavelength dependent properties of—optical components such as the wavelength dependent loss e.g. of wavelength division multiplexers (WDMs) or fiber bragg gratings. The first setup comprises a tunable laser source in combination with an optical power meter, and the second setup comprises a broadband light source (e.g. a 'white' light source) in combination with an optical spectrum analyzer. These instruments are connected to the input and output of a device-under-test (DUT). This way, e.g. the insertion-loss can be measured as a function of the wavelength. For wavelength dependent return-loss measurements, a return-loss test setup is needed with input for a wavelength variable light source. A detailed description of measurement setups as known in the art for determining wavelength dependent properties of optical components is given by Dennis Derickson in "Fiber optic test and measurement", ISBN 0-13-534330-5, 1998, referenced herein as (1), pages 358 ff.

For certain applications, such as in fiber optic networks, it has been found disadvantageous that all the described techniques require the device under test to be directly accessible 'on the workbench', i.e. that a direct measurement of the actual frequency behavior of the DUT 'in situ' is not possible.

SUMMARY OF THE INVENTION

It is an object of the invention to provide an improved possibility for determining wavelength dependent information about optical components. A further object is to allow 'in situ' and remote measurements of the wavelength dependent properties of the optical components.

The invention takes advantage of the optical time-domain reflectometry measurement technique as depicted in FIG. 1a in a basic block diagram. An optical time-domain reflectometer (OTDR) 10 injects a pulsed signal 20 into a fiber optic network comprising a link 30, e.g. an optical fiber 30, which is in an optical connection with one or more optical components 40, e.g. fibers or filters, or the like. The pulsed signal 20 typically is a laser pulse at a certain laser wavelength. A small amount of the pulsed signal 20 is continuously scattered back in the opposite direction towards the OTDR 10, representing attenuation, loss, and reflectance in an optical structure (or network under test) 50 comprised of the fiber 30 and the optical components 40. By measuring the amount of backscattered and/or reflected signal versus time, the loss versus distance of the optical structure 50 is measured. In general, the results of one or more individual measurements are combined and that combination represents an OTDR trace of the optical structure 50.

FIG. 1b depicts an example of an OTDR trace received from an OTDR measurement, wherein the x-axis corresponds to the distance between the OTDR 10 and a location in the optical structure 50, and the y-axis shows the power level of the reflected signal level typically on a logarithmic scale (in dB) revealing details about the optical link loss in the optical structure 50. A detailed description of the current knowledge about OTDRs and analyses of OTDR traces is given in detail by one of the inventors in (1) on pages 434 ff.

From U.S. Pat. No. 5,179,420 it is known that an OTDR can be employed in combination with a variable wavelength laser source in order to display the effect of wavelength dependent fiber attenuation and chromatic dispersion of an optical fiber path. However, this mere representation of the effect of wavelength dependencies does not allow drawing back conclusions on individual optical components in the optical structure, but only reveals useful (qualitative) information for elongated components such as optical fibers. A (quantitative) characterization of the wavelength dependent properties of individual optical components cannot be given.

According to the invention, a system for determining wavelength dependent information comprises at least one light emitting source for providing light signals at a plurality of different wavelengths to an optical link which is in an optical connection with the optical component in an optical structure, and a measuring unit for measuring a backscattered and/or reflected signal versus time returning from the optical structure. The system further comprises a processing unit for determining the wavelength dependent information about the optical component by processing the backscattered and/or reflected signal versus time as measured for a plurality of light signals at different wavelengths.

Accordingly, the invention provides a method for determining wavelength dependent information by providing light signals at a plurality of different wavelengths to the optical link, measuring a backscattered and/or reflected signal versus returning from the optical structure, and determining the wavelength dependent information about the optical component by processing the backscattered and/or reflected signal versus time as measured for a plurality of light signals at different wavelengths.

Advantageous embodiments of the invention can be found in the dependent claims.

The determination of the wavelength dependent information/properties of optical components according to the invention reveals a number of benefits compared to the standard loss-test methods:

- There is only a one-port-access to the optical component to be measured necessary. This is extremely useful in cases where the optical component is placed far off e.g. in a fiber optic link.
- The optical component can be tested under real world conditions. Thus, any environmental influence affects the result directly.
- Any aging effect of the optical component can be traced accurately.
- There is no need to interrupt the link to the optical component in order to remove the optical component for testing purposes.
- Automatic monitoring of specific DUTs can be performed remotely by Remote Fiber-Optic Test System (RFTS).

A particularly advantageous application of the invention is to determine the wavelength dependent spatial structure of an optical network. In that case, the wavelength dependent information is associated with spatial information about the optical component. This allows to draw back conclusions about the wavelength dependent network topology.

BRIEF DESCRIPTION OF THE DRAWINGS

Other objects and many of the attendant advantages of the present invention will be readily appreciated and become better understood by reference to the following detailed description when considering in connection with the accompanied drawing in which:

FIG. 6a depicts an example of an optical network with a plurality of optical components, and FIG. 6b displays the measurements results with 4 different wavelengths $\lambda 1$, $\lambda 2$, $\lambda 3$, and $\lambda 4$ in the network of FIG. 6a.

DETAILED DESCRIPTION OF THE INVENTION

Figure 1A:
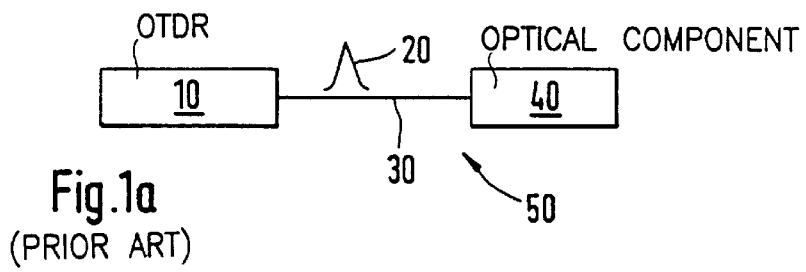
FIG. 1a depicts a basic block diagram of the optical time-domain reflectometry measurement technique as known in the art.
Figure 1B:
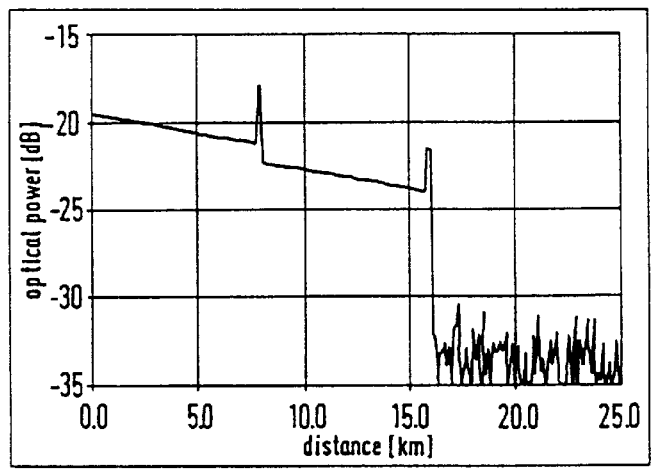
FIG. 1b shows a typical OTDR trace.
Figure 2:
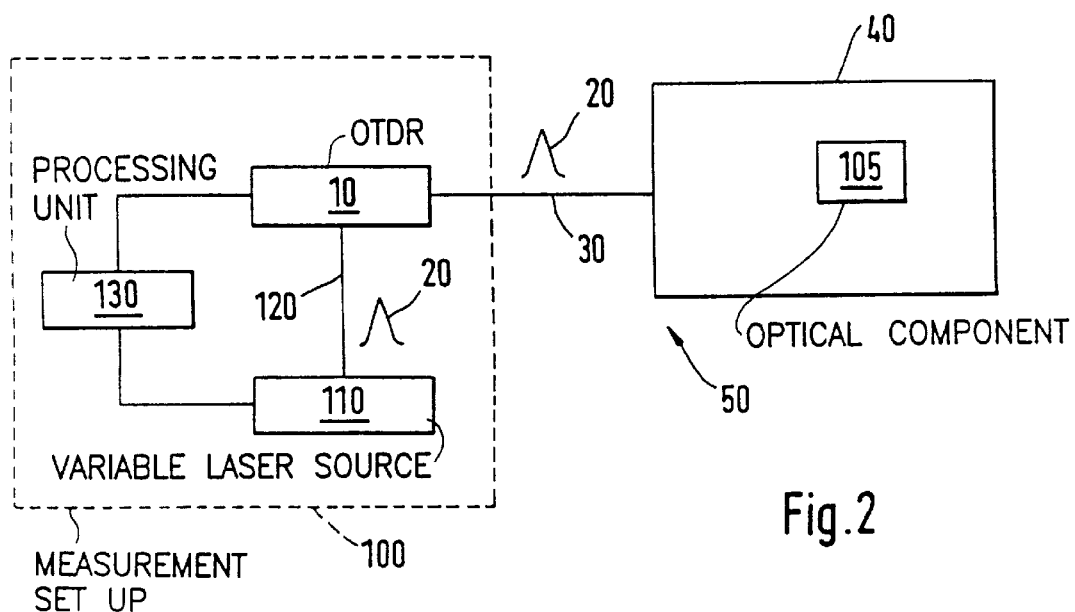
FIG. 2 shows the principal structure of a measurement setup according to the invention for determining wavelength dependent properties of an optical component.

FIG. 2 shows the principal structure of a measurement setup 100 according to the invention for determining wavelength dependent properties of an optical component 105. The optical component 105 represents an individual part within the optical structure 50 comprised of the one or more optical components 40 and may be connected to the fiber 30 by any optical connection as known in the art. A variable wavelength laser source (VWLS) 110 is coupled to the optical time-domain reflectometer (OTDR) 10 via a line 120 for providing the laser signal 20 to be injected into the fiber 30 at a plurality of different wavelengths. It is clear that instead of one laser source emitting laser signals 20 at different wavelengths, also a plurality of laser sources each emitting a laser signal 20 at a certain wavelength can be employed, whereby the individual wavelengths of the plurality of laser sources vary.

The optical component 105 to be measured can be any optical component such as a wavelength-dependent-multiplexer, arrayed-waveguide-grating, fiber-bragg-gratings, or any other optical filter. The optical structure 50 can be a part e.g. of a dense wavelength division multiplexing (DWDM) network. Wavelength dependent parameters received or determined from the collected wavelength dependent data be e.g. center wavelength, bandwidth, channel spacing, out-of-band suppression, reflectivity and return-loss and so on.

In case that the optical structure 50 comprises one or more optical amplifiers, such as EDFAs (erbium doped fiber amplifiers), the thus present ASE (amplified spontaneous emission) might have to be reduced for achieving reliable OTDR measurement results. This can be accomplished e.g. by providing an optical filter (e.g. a pass-band filter) in the optical path between the OTDR 10 and the optical structure 50, or by using a OTDR with a coherent detection scheme.

A processing unit 130 is coupled to the OTDR 10 and to the variable laser source 110. The processing unit 130, which might also be a functional part of the OTDR 10, controls the variable laser source 110 to provide the laser signal 20 at varying wavelengths to the OTDR 10, and thus onto the fiber 30. The OTDR 10 measures the amount of backscattered and/or reflected signal versus time for each wavelength provided by the laser signal 20, and delivers that information as "OTDR information" for each wavelength to the processing unit 130. The OTDR 10 might further determine one or more OTDR traces from the measured amount of backscattered and/or reflected signal versus time for each wavelength provided by the laser signal 20.

The processing unit 130 receives the OTDR information for each wavelength and determines therefrom the wavelength dependent properties of the optical component 105 by extracting and processing the information which corresponds to the optical component 105.

In a first step for determining wavelength dependent properties of the optical component 105 from OTDR information, the optical component 105 is to be identified as a so-called event within the OTDR information. As known in the art, the optical component 105 can be identified within the OTDR information as corresponding to a certain distance D in the optical structure 50.

Figure 3A:
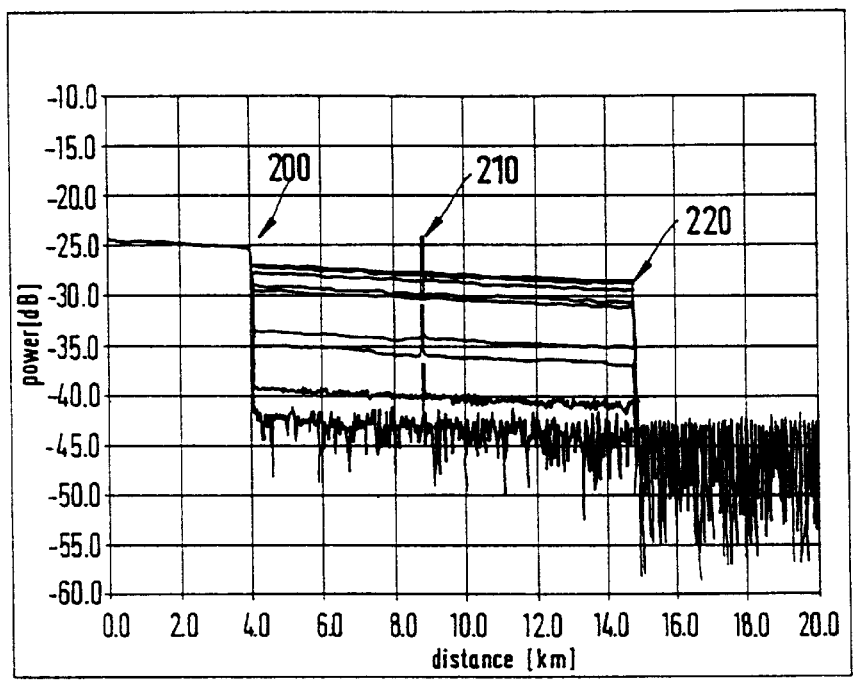
FIGS. 3a and 4a show examples of OTDR information for a plurality of different wavelengths represented by a plurality of OTDR traces superimposed.

FIG. 3a shows an example of OTDR information for a plurality of different wavelengths represented by a plurality of OTDR traces superimposed. The x-axis depicts the distance in km and the y-axis shows the power in dB. FIG. 3a reveals three different events in the OTDR traces: a non-reflective event 200 at about distance 4.0 km, a reflective event 210 at about distance 8.8 km, and a fiber end 220 at about distance 14.7 km. In general, any event, reflective or non-reflective, in the OTDR information represents either an optical component (including splices and connectors) or a potential fault in the optical structure 50.

Events in the OTDR information can either be identified manually, e.g. by analyzing the OTDR traces, or automatically by means of the OTDR 10 or the processing unit 130, as well known in the art (cf. e.g. section 11.4 of (1)).

In a next step, information of the OTDR information relating to the optical component 105—as one event—is collected for the different wavelengths as measured and represents an "event information". The event information comprises wavelength dependent properties of the optical component 105. Common parameters of wavelength dependent properties, for example, are event loss (also called insertion loss) and reflectance, but also center wavelength, cross talk, directivity, and isolation. The latter parameters can be used e.g. to derive a filter's stop-band attenuation. In general, those properties depend as well on wavelength as on the polarization of light.

In several cases, the event information, such as the wavelength dependent properties, cannot be extracted directly from the OTDR information, and a further processing, such as determining and/or calculating event loss and/or reflectance values, is required and can be done as known in the art. For those skilled in the art, it is apparent, for example, that a direct 'reading' of measured values, such as power values, at the event's distance D for different wavelengths will only be possible in very rare cases. Problems might occur from superimposed noise, smoothed transition regions because of extended pulse width, finite receiver bandwidth and digital filtering, or polarization noise. In most cases, the actual values for the event information therefore need to be calculated, extrapolated, or otherwise received as explained e.g. in section 11.4 of (1). Those techniques are well established in the art and can be applied for the purposes of the invention.

Figure 3B:
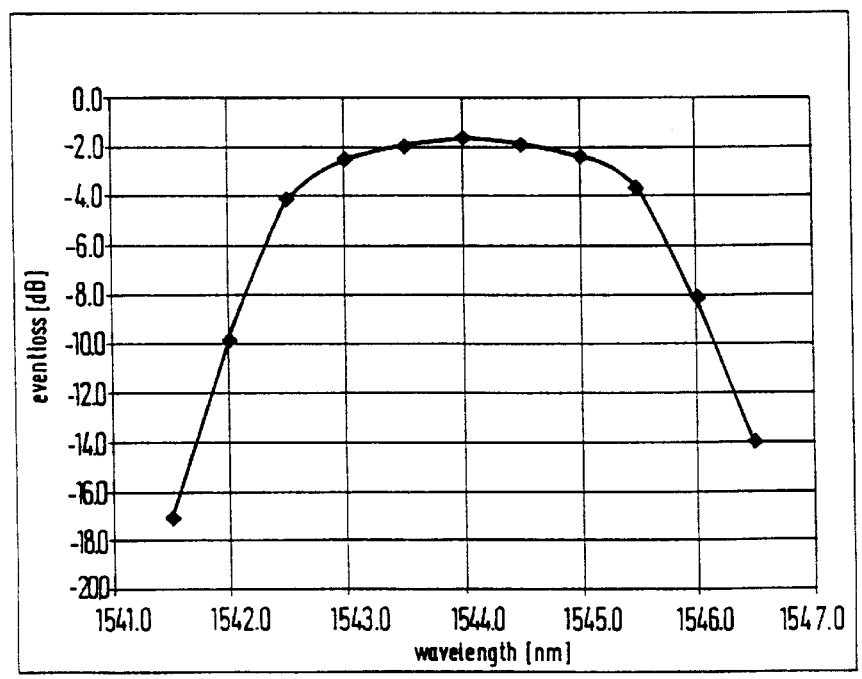
FIGS. 3b and 4b show the wavelength dependent properties for the examples of FIGS. 3a and 4a determined according to the invention.

In a last step, the event information might be displayed, as known in the art, e.g., the wavelength dependent properties in an event loss or reflectance diagram. For each event and each measuring wavelength, the event loss can be determined and e.g. plotted over the wavelength as depicted in FIG. 3b for the non-reflective event 200.

The determination and display of event information shall be explained in the following for the examples of event loss and reflectance.

The event loss of the optical component 105 can be calculated from the difference in the backscatter signal level of the OTDR information before and after an event. More accurate results are obtainable when information about pulsewidth and receiver bandwidth is taken into account to exactly determine the event's position D. State-of-the-art algorithms using LSA (least square approximation) or pattern matching methods for insertion or splice-loss calculations can be found in the technical literature, e.g., "A pattern matching algorithm for remote systems that measures the distance and loss of fusion splices with high precision" by D. Anderson and D. Judge, NFOEC'94, San Diego. In an example of the OTDR information represented by the OTDR traces of FIG. 3a, the backscatter signals of the non-reflecting event 200 (e.g. a single optical filter) for a plurality of different wavelengths remain substantially constant 'before' the event 200, i.e. at the left side of event 200, and exhibit a strong wavelength dependence in a distance 'behind' the component, i.e. at the right side of the event 200. The values of event loss for the different wavelengths represent the event information of the event 200 and might be displayed as event loss versus wavelength as depicted in FIG. 3b exhibiting a filter characteristic of the event 200.

Figure 4A:
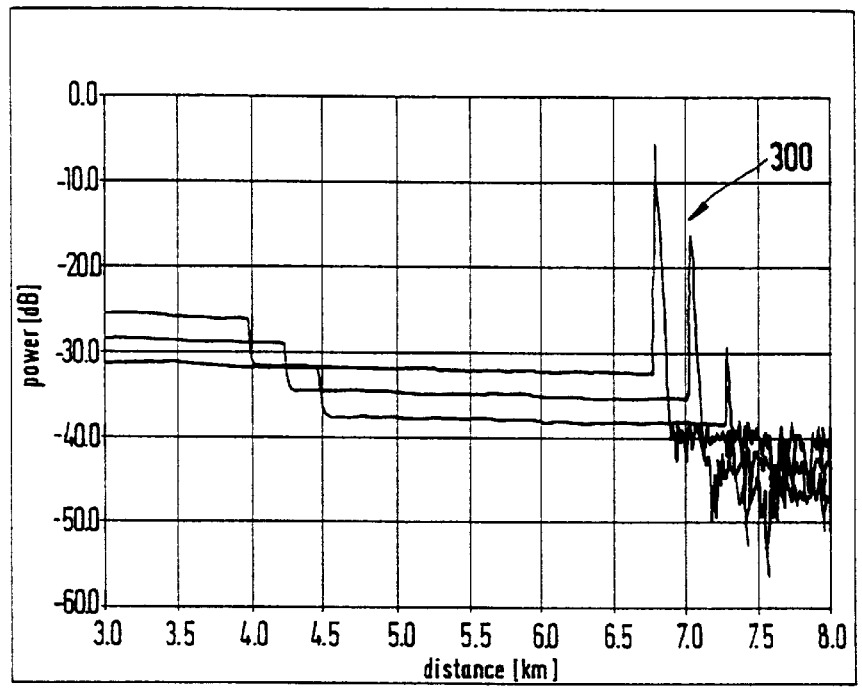
Figure 4B:
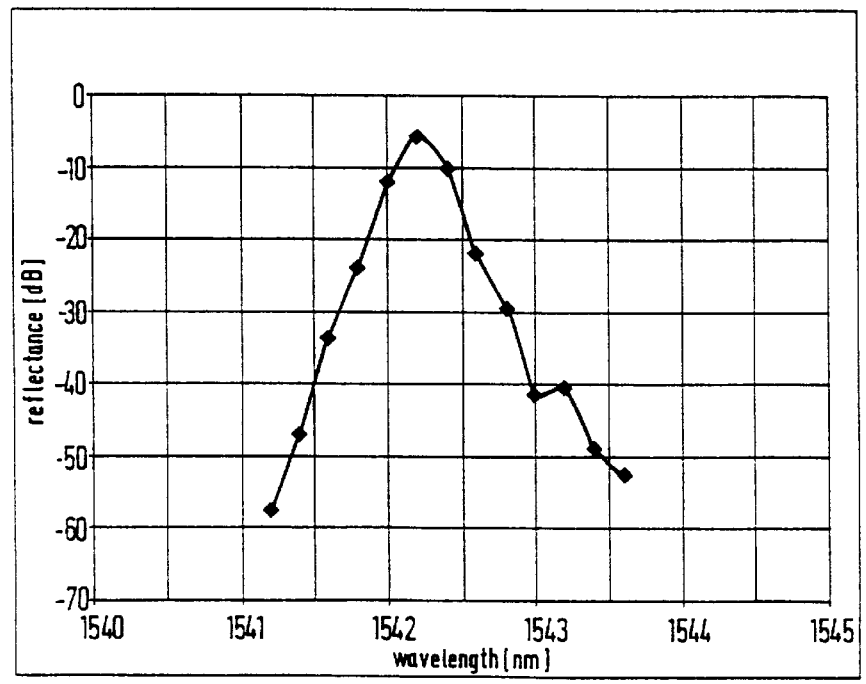

The reflectance of the optical component 105, e.g. a Bragg grating, can be determined from the difference in the backscatter signal level of the OTDR information before and at a peak value of reflection at the position of the event. With the additional information about the pulsewidth and the fiber's scatter factor, the individual reflectance values can be calculated for each measurement wavelength as referenced e.g. in (1), pages 461 ff. In an example of the OTDR information represented by the OTDR traces of FIG. 4a, the backscatter signals of a reflecting event 300 for a plurality of different wavelengths remain substantially constant 'before' the event 300, i.e. to the left of event 300, and exhibit a strong wavelength dependence at the position of the event 300. For the sake of a better understanding, the individual OTDR information plots in FIG. 4a are displaced in horizontal and vertical direction for three different wavelengths, so that the peak values of reflection at the position D of the event 300 do not coincide. The values of reflectance for the different wavelengths represent the event information of the event 300 and might be displayed as reflectance versus wavelength as depicted in FIG. 4b exhibiting a filter characteristic of the event 300.

Figure 5:
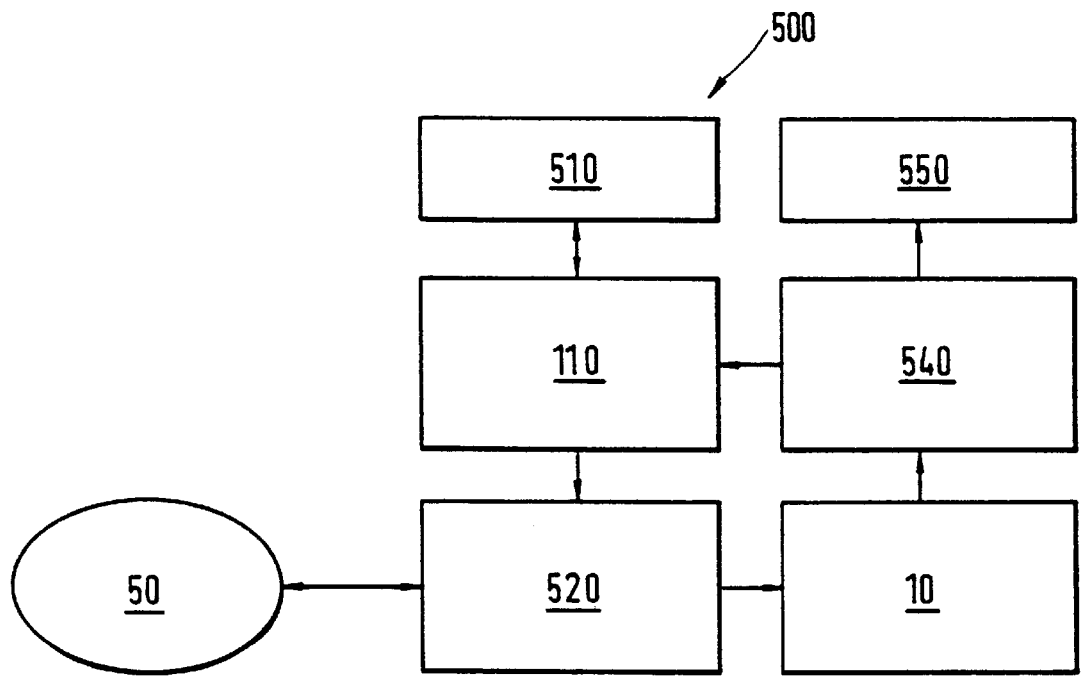
FIG. 5 shows an embodiment of the measurement setup according to the invention.

FIG. 5 shows an embodiment 500 of the measurement setup 100 according to the invention for determining wavelength dependent properties of the optical component 105. In order to be able to make OTDR measurements with varying wavelengths, a generic fixed-wavelength OTDR 10 is equipped with a variable wavelength laser source (VWLS) 110. This can be accomplished in presently available OTDR arrangements by replacing a fixed wavelength laser or by providing an external input in the OTDR 10 for the VWLS 110. A laser control unit 510—as part of the processing unit 130—controls the wavelength and pulsewidth of the laser signal 20 from the VWLS 110, e.g. in association with the OTDR 10. The laser signal 20 is guided via a bi-directional coupler 520 to a front connector (not shown in FIG. 5) where the optical structure 50 is attached to.

The optical structure 50 reacts with a return signal to the probing laser signal 20 that is guided via the bi-directional coupler 520 to the OTDR receiver 10. After an optical-electrical (O/E) conversion, the received signal may be digitized and is further processed in a signal-processing block 540—as part of the processing unit 130. A display unit 550 might indicate the actual wavelength of the VWLS 110 and the processed measurement results.

If the output power of the VWLS 110 does not meet the requirements for an OTDR source, an additional erbium doped fiber amplifier (EDFA) can be inserted between the VWLS 110 and the bi-directional coupler 520 to boost the laser pulse 20 to a sufficient level.

For determining the wavelength dependent characteristics, a series of OTDR traces of the optical structure 50 including the optical component to be measured 105 are taken at different wavelengths. The wavelength increment and the wavelength span of the laser signals 20 are chosen according to a required resolution, accuracy, and purpose of the result. At the distance that corresponds to the location of the optical component 105 as the device under test, the traces show an insertion-loss and/or reflectance changing with wavelength. For each wavelength, the insertion-loss and/or reflectance values need to be calculated. In a final step, the determined wavelength dependent characteristics of the optical component 105 such as the insertion-loss and/or reflectance values may be plotted as a function of wavelength.

It is clear from the above said, that the invention can be used to determine the wavelength dependent properties of an individual optical component 105 within the optical structure 50. In that case, the resolution of the wavelength dependent properties mainly depends on the number of laser signals 20 with different wavelengths and the wavelength differences between 'neighboring' laser signals 20.

Another application of the invention is to determine the wavelength dependent topological structure of an optical network. In that case, the event information is determined for a plurality of individual events representing individual optical components. That event information, representing wavelength dependent properties such as event loss and reflectance, for the plurality of individual events in combination with other information, in particular spatial information representing spatial properties of each event, such as the distance or type, allows to gain information about the spatial structure of the optical network, i.e. about the spatial distribution and interconnection of the events and thus of the components 105 and 40 in the network of the optical structure 50.

Figure 6A:
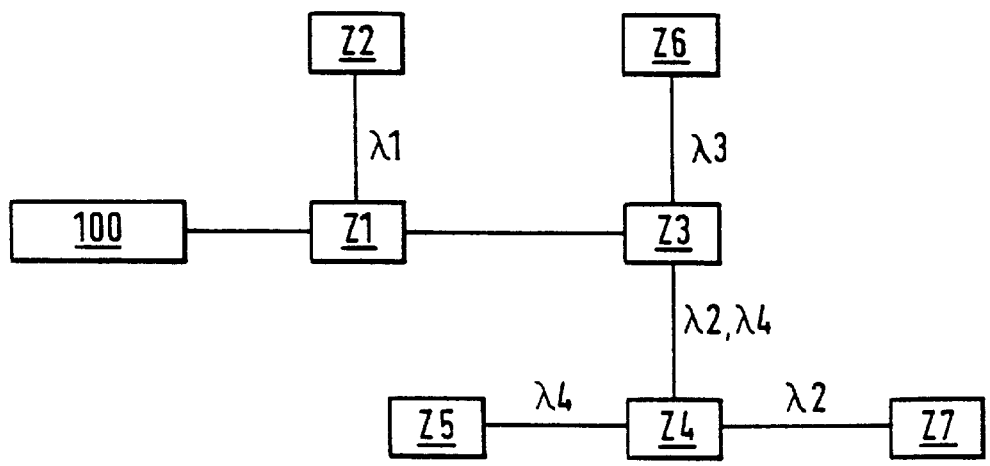

FIG. 6a depicts an example of a network of the optical structure 50 with a plurality of optical components $Z_i$, with $i=1 \ldots n$, coupled to the measurement setup 100 according to the invention. A component Z1 is coupled to the measurement setup 100 at a distance z1. All distances $z_i$ for $i=1 \ldots n$ shall refer to the measurement setup 100. The component Z1 represents an optical wavelength division multiplexer (WDM) which passes all signals at a wavelength $\lambda 1$ to a component Z2, at a distance z2, and all signals at other wavelengths to a component Z3 at a distance z3. Component Z3 again branches wavelengths $\lambda 2$ and $\lambda 4$ to a component Z4 at distance z4, and wavelength $\lambda 3$ to a component Z6 at distance z6. Component Z4 eventually branches the wavelength $\lambda 2$ to a component Z7 at distance z7 and the wavelength $\lambda 4$ to a component Z5 at distance z5.

Figure 6B:
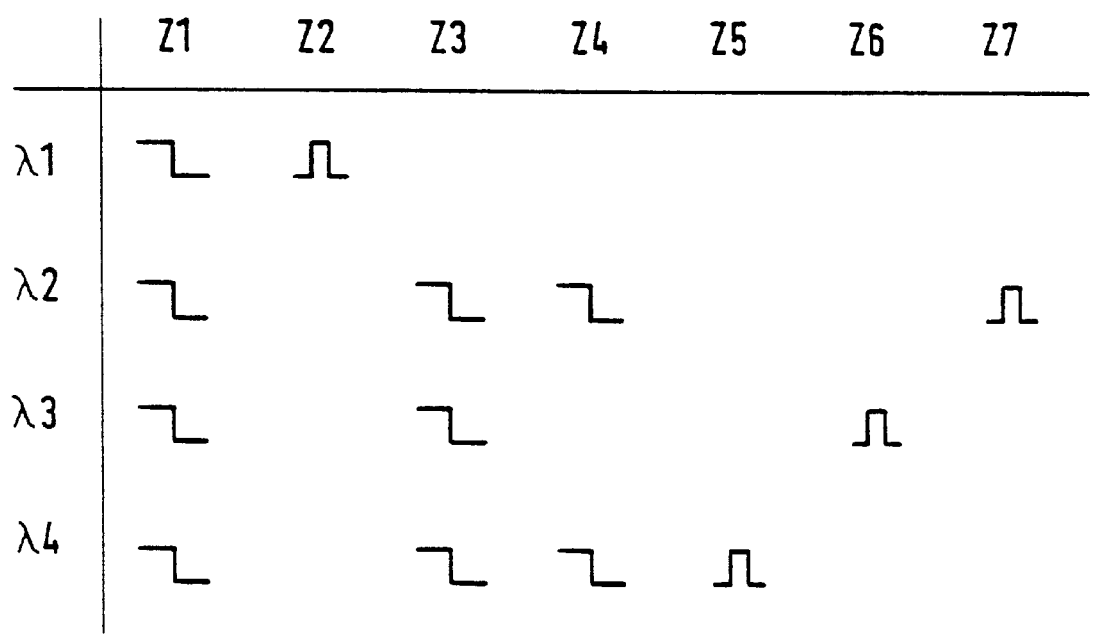

In case that the principal characteristics of the components Z1 to Z7 is known, (i.e. the components are either transparent or non-transparent for a given wavelength), and only the spatial distribution thereof is to be determined, 4 OTDR measurements with the 4 different wavelengths $\lambda 1$, $\lambda 2$, $\lambda 3$, and $\lambda 4$ are sufficient. FIG. 6b shows the results thereof. Component Z1 represents a non-reflecting event for all wavelengths λ1, λ2, λ3, and λ4. Component Z2 represents a reflecting event for wavelength λ1, whereas component Z3 represents a non-reflecting event, however only for wavelength λ2, λ3, and λ4. Since component Z3 is located spatially 'behind' component Z1 (since z3>z1), it is clear that component Z1 must have branched off only the wavelength λ1 to the component Z2 and transmitted the other wavelengths λ2, λ3, and λ4 to the components Z3.

Component Z4 ('behind' component Z3, since z4>z3) represents a non-reflecting event for the wavelengths λ2 and λ4, whereas component Z6 (also 'behind' component Z3 with z6>z3) represents a reflecting event for the wavelength λ3. Therefore, component Z3 must have branched off the wavelength λ3 to component Z6 and the wavelengths λ2 and λ4 to the component Z4. Eventually, since component Z5 ('behind' component Z4, z5>z4) only reflects wavelength λ4 and component Z7 ('behind' component Z4, z7>z4) only reflects wavelength λ2, it is apparent that the component Z4 must have branched off wavelength λ4 to component Z5 and wavelength λ2 to component Z7. The spatial distribution of the components Z1 to Z7 is therefore clearly derivable from the results of the OTDR measurements with different wavelengths as shown in Table 1 and can be illustrated in a diagram as shown in FIG. 6.

In case that the principal characteristics of the components Z1 to Z7 is not known, further OTDR measurements with the different wavelengths are required for characterizing each individual component and the spatial relationship therebetween.

We claim:

1. A system for determining wavelength dependent information, including at least one of event loss, reflectance, center wavelength, cross talk, directivity or isolation, about an optical component in an optical structure, the system comprising:

at least one light emitting source for providing light signals at a plurality of different wavelengths to an optical component, and a measuring unit for measuring at least one of a backscattered or reflected signal versus time returning from the optical component, characterized by:

a processing unit for determining quantitative wavelength dependent information about the optical component by processing the measured signal versus time as measured for a plurality of light signals at different wavelengths returned from a position at which said component is positioned in said optical structure.

2. The system of claim 1, wherein the processing unit comprises:

means for identifying the optical component in the measured signal for each measuring wavelength, and means for collecting the wavelength dependent information relating to the identified optical component in the measured signal for each measuring wavelength.

3. The system of claim 1, wherein the processing unit comprises means for visualizing the wavelength dependent information.

4. The system of claim 1, wherein the processing unit is coupled to the at least one light emitting source for controlling the at least one light emitting source for providing the light signals at varying wavelengths to the measuring unit, and thus onto the optical structure.

5. The system of claim 1, wherein the light emitting source is a variable wavelength laser source.

6. The system of claim 1, further comprising means for associating the wavelength dependent information with spatial information about the optical component for gaining information about a spatial structure of an optical structure.

7. A method for determining wavelength dependent information, including at least one of event loss, reflectance, center wavelength, cross talk, directivity, or isolation, about an optical component in an optical structure, comprising the steps of:

providing light signals at a plurality of different wavelengths to an optical component, measuring at least one of a backscattered or a reflected signal versus time returning from the optical structure, and determining wavelength dependent quantitative information about the optical component by processing the measured signal versus time as measured for a plurality of light signals at different wavelengths from the local position of the optical component.

8. The method of claim 7, wherein step (c) comprises the steps of:

(c1) detecting and identifying the optical component in the measured signal for each measuring wavelength, and (c2) collecting the wavelength dependent information relating to the identified optical component in the measured signal for each measuring wavelength.

9. The method of claim 7, wherein step (c) comprises a step of:

visualizing the wavelength dependent information.

10. The method of claim 7, further comprising a step of:

(d) associating the wavelength dependent information with spatial information about the optical component for gaining information about a spatial structure of an optical structure.

* * * * *